(12) United States Patent
Liu et al.

(10) Patent No.: US 11,297,990 B2
(45) Date of Patent: Apr. 12, 2022

(54) DUST COLLECTOR AND SELF-CLEANING METHOD FOR FILTER THEREOF

(71) Applicant: SKYBEST ELECTRIC APPLIANCE (SUZHOU) CO., LTD., Suzhou (CN)

(72) Inventors: Haiping Liu, Suzhou (CN); Zhao Kong, Suzhou (CN); Liang Xia, Suzhou (CN)

(73) Assignee: SKYBEST ELECTRIC APPLIANCE CO., LTD., Suzhou (CN)

( * ) Notice: Subject to any disclaimer, the term of this patent is extended or adjusted under 35 U.S.C. 154(b) by 214 days.

(21) Appl. No.: 16/465,705

(22) PCT Filed: Dec. 5, 2017

(86) PCT No.: PCT/CN2017/114536
§ 371 (c)(1),
(2) Date: Jul. 11, 2019

(87) PCT Pub. No.: WO2018/099488
PCT Pub. Date: Jun. 7, 2018

(65) Prior Publication Data
US 2019/0350422 A1 Nov. 21, 2019

(30) Foreign Application Priority Data

Dec. 1, 2016 (CN) .......................... 201611088626.8
Dec. 12, 2016 (CN) .......................... 201611139111.6

(51) Int. Cl.
*B01D 46/00* (2006.01)
*A47L 9/20* (2006.01)
(Continued)

(52) U.S. Cl.
CPC .............. *A47L 9/20* (2013.01); *A47L 9/102* (2013.01); *B01D 46/0005* (2013.01);
(Continued)

(58) Field of Classification Search
CPC .......... A47L 9/20; A47L 9/102; A47L 7/0071; A47L 9/00; B01D 46/0005;
(Continued)

(56) References Cited

U.S. PATENT DOCUMENTS

| 4,199,333 A * | 4/1980 | Ferri | ....................... B01D 46/26 55/290 |
| 4,906,259 A * | 3/1990 | Yen | .......................... A47L 9/102 55/343 |

(Continued)

FOREIGN PATENT DOCUMENTS

| CN | 203042127 U | 7/2013 |
| CN | 203898201 U | 10/2014 |

(Continued)

OTHER PUBLICATIONS

International Search Report for Application No. PCT/CN2017/114536, dated Feb. 12, 2018.

*Primary Examiner* — Dung H Bui
(74) *Attorney, Agent, or Firm* — JK Intellectual Property Law, PA

(57) ABSTRACT

A vacuum cleaner includes an air inlet, a filter, a fan, and a main air outlet. The filter has a clean side and an unclean side. An unclean air chamber is formed between the air inlet and the unclean side of the filter. A first air chamber is formed between the clean side of the filter and the fan. An air outlet chamber is formed between the fan and the main air outlet. The upstream end of the air outlet chamber is connected to the first air chamber. An airflow may enter the vacuum cleaner from an external environment via the air inlet under the action of the fan, and sequentially passes through the unclean air chamber, the filter, the first air chamber and the air outlet chamber the main air outlet. The vacuum cleaner may include a self-cleaning air passage and an air supply air passage.

8 Claims, 7 Drawing Sheets

(51) Int. Cl.
*A47L 9/10* (2006.01)
*B01D 46/42* (2006.01)

(52) U.S. Cl.
CPC ..... *B01D 46/0079* (2013.01); *B01D 46/4272* (2013.01); *B01D 2279/55* (2013.01)

(58) Field of Classification Search
CPC ............ B01D 46/0079; B01D 46/4272; B01D 2279/55; B01D 46/0068; B01D 46/2411; B01D 2273/30; F24F 8/10
See application file for complete search history.

(56) References Cited

U.S. PATENT DOCUMENTS

| | | | | |
|---|---|---|---|---|
| 6,113,663 | A * | 9/2000 | Liu | A47L 5/365 55/459.1 |
| 6,440,191 | B1 * | 8/2002 | Berfield | A47L 5/365 15/353 |
| 8,393,048 | B2 * | 3/2013 | Rentschler | B01D 46/46 15/319 |
| 2007/0125049 | A1 * | 6/2007 | Menrik | A47L 9/1666 55/337 |
| 2010/0306955 | A1 * | 12/2010 | Menrik | B01D 45/18 15/347 |
| 2013/0276262 | A1 * | 10/2013 | Wolfe | A47L 7/0071 15/347 |
| 2016/0100724 | A1 * | 4/2016 | Valentini | G08C 17/02 134/18 |
| 2016/0331198 | A1 | 11/2016 | Plato et al. | |
| 2017/0340179 | A1 * | 11/2017 | Peflof | A47L 9/2884 |
| 2019/0150683 | A1 * | 5/2019 | Valentini | B01D 46/442 |
| 2019/0350422 | A1 * | 11/2019 | Liu | A47L 9/20 |

FOREIGN PATENT DOCUMENTS

| | | |
|---|---|---|
| CN | 106175595 A | 12/2016 |
| CN | 106725113 A | 5/2017 |
| CN | 107456159 A | 12/2017 |

* cited by examiner

DUST COLLECTOR AND SELF-CLEANING METHOD FOR FILTER THEREOF

CROSS-REFERENCE TO RELATED APPLICATIONS

This application is a national stage of International Application No. PCT/CN2017/114536, filed Dec. 5, 2017, and claims benefit to Chinese Patent Application Nos. 201611088626.8, filed Dec. 1, 2016 and 201611139111.6, filed Dec. 12, 2016, both of which are incorporated by reference herein.

TECHNICAL FIELD

The disclosure relates to a vacuum cleaner, and more particularly relates to an ash vacuum cleaner, especially to a self-cleaning structure of an ash vacuum cleaner, which relates to the technical field of household appliances. This disclosure further relates to a self-cleaning method of a vacuum cleaner filter.

BACKGROUND

Ash vacuum cleaners are a kind of commonly used household appliance. In the prior art, ash vacuum cleaners have a large power and a large amount of air intake, which lays a heavy burden on their filters. After working for a long time, dust can easily accumulate on the interior of the filter, which would adversely affect the effective vacuuming time, leading to significantly deteriorated vacuuming effects. Meanwhile, the service life of the filter is also reduced. In addition, in the use of the prior vacuum cleaner, the user needs to frequently disassemble the filter for cleaning, resulting in a large load of cleaning work bringing the user a poor experience.

SUMMARY

One object of the present disclosure is to solve the problem that ash vacuum cleaners in the prior art cannot achieve the self-cleaning of filters, so as to provide a vacuum cleaner having a self-cleaning function.

One embodiment of the present application provides a vacuum cleaner that includes an air inlet, a filter, a fan, and a main air outlet; the filter has a clean side and an unclean side; an unclean air chamber is formed between the air inlet and the unclean side of the filter; a first air chamber is formed between the clean side of the filter and the fan; an air outlet chamber is formed between the fan and the main air outlet, wherein the upstream end of the air outlet chamber is connected to the first air chamber; when the vacuum cleaner is in a suction mode, an airflow enters the vacuum cleaner from an external environment via the air inlet under the action of the fan, and sequentially passes through the unclean air chamber, the filter, the first air chamber and the air outlet chamber, and then is discharged via the main air outlet to the external environment which communicates with the main air outlet; the vacuum cleaner includes a self-cleaning air passage and an air supply air passage, wherein the upstream end of the self-cleaning air passage is communicated to the air outlet chamber, and the downstream end of the self-cleaning air passage is communicated to the clean side of the filter; the upstream end of the air supply air passage is in directly airflow communication with the external environment, and the downstream end of the air supply air passage is in airflow communication with the first air chamber.

Further, in the above vacuum cleaner having a self-cleaning function, when in self-cleaning mode, the main air outlet is closed, and the entire airflow between the fan and the main air outlet can flow to a partial clean side of the filter.

Further, in the above vacuum cleaner having a self-cleaning function, when in self-cleaning mode, the air inlet is at least partially closed.

Further, in the above vacuum cleaner having a self-cleaning function, the vacuum cleaner further includes a fan cover and a fan mount; the fan cover includes a cover portion and a cylinder portion which is disposed inside the fan mount; a gap between the fan mount and the cylinder portion is separated to form a fifth air chamber and a sixth air chamber, and the air outlet chamber is provided with an air inlet on it for the self-cleaning air passage; the upstream end of the sixth air chamber communicates with the air outlet chamber via the air inlet of the self-cleaning air passage, and the downstream end of the sixth air chamber communicates with the clean side of the filter.

Further, in the above vacuum cleaner having a self-cleaning function, the cylinder portion is provided with a pair of second baffles configured to separate the gap between the fan mount and the cylinder portion to form the fifth air chamber and sixth air chamber.

Furthermore, in the above vacuum cleaner having a self-cleaning function, the fan mount is provided with a blow hole communicating with the clean side of the filter, wherein the airflow in the sixth air chamber can blow to the clean side of the filter via the blow hole.

Furthermore, in the above vacuum cleaner having a self-cleaning function, the vacuum cleaner further includes a filter bracket, and the fan is disposed inside the fan mount; the first air chamber is formed by a gap surrounded by the filter, the inner side of the filter bracket, and the fan mount, and the upstream end of the first air chamber communicates with the external environment via the filter.

Furthermore, in the above vacuum cleaner having a self-cleaning function, the fan mount is provided with an air inlet for the fan mount; the inner cavity of the cylinder portion is the second air chamber, and the downstream end of the first air chamber and the lower upstream end of the second air chamber communicate with each other via the air inlet of the fan mount.

Furthermore, in the above vacuum cleaner having a self-cleaning function, the vacuum cleaner further includes an upper cover, wherein the main air outlet is defined in the upper cover; the fan cover is provided with a fan cover air outlet, and a gap enclosed between the upper cover and the fan cover is separated to form a third air chamber and a fourth air chamber; the downstream end of the second air chamber is connected to the upstream end of the third air chamber via the fan cover air outlet, and the downstream end of the third air chamber is connected to the external environment via the main air outlet; the second air chamber and the third air chamber are combined to form the air outlet chamber; when the vacuum cleaner is in the suction mode, the airflow sequentially passes through the first air chamber, the second air chamber, the third air chamber and then is discharged to the external environment.

Furthermore, in the above vacuum cleaner having a self-cleaning function, the fan cover is provided with a first baffle configured to separate a gap between the upper cover and the fan cover to form the third air chamber and the fourth air chamber, and when the vacuum cleaner is in a self-cleaning mode, the airflow in the first air chamber sequentially enters the second air chamber, the third air chamber, and the sixth air chamber, and finally blows toward the clean side of the filter.

Furthermore, in the above vacuum cleaner having a self-cleaning function, the first air inlet is defined in the upper cover, and a second air inlet is defined in the fan cover; the first air inlet and the second air inlet are located in the area where the fourth air chamber is located, and the upstream end of the fourth air chamber is connected to the external environment via the first air inlet, the downstream end of the fourth air chamber is connected to the upstream end of the fifth air chamber via the second air inlet, and the fourth air chamber and the fifth air chamber are combined to form an air supply passage.

Furthermore, in the above vacuum cleaner having a self-cleaning function, the fan mount is provided with an air supply hole, and the downstream end of the fifth air chamber communicates with the first air chamber via the air supply hole; when the vacuum cleaner is in the self-cleaning mode, the airflow from the external environment passes through the fourth air chambers, the fifth air chamber and the first air chamber to enter the second air chamber.

Furthermore, in the above vacuum cleaner having a self-cleaning function, the air supply hole is adjacent to the air inlet of the fan mount.

Other embodiment of the present application further discloses a self-cleaning method for the vacuum cleaner filter, the vacuum cleaner including a self-cleaning air passage and an air supply passage, the air supply passage being provided with an air supply valve, and the self-cleaning air passage being provided with a self-cleaning valve; the method including the following steps: ① open the air supply valve to allow an airflow to enter the air supply passage; ② open the self-cleaning valve to allow the airflow to enter the self-cleaning air passage, and close the main air outlet; ③ close the self-cleaning valve and open the main air outlet; ④ and close the air supply valve.

Preferably, in the above steps, step ② and the step ③ are repeated at least twice between the step ① and the step ④.

Other embodiment of the present application further discloses a vacuum cleaner which includes a self-cleaning air passage and a self-cleaning valve; the self-cleaning air passage is provided with an air inlet for the self-cleaning air passage, wherein the self-cleaning valve is selectively to open or close the air inlet for the self-cleaning air passage; the vacuum cleaner further includes an air supply air passage and an air supply valve; the air supply air passage is provided with a second air inlet, and the air supply valve selectively opens or closes the second air inlet; the air supply valve is configured to opens the second air inlet before the self-cleaning valve opens the air inlet of the self-cleaning air passage.

Further, the vacuum cleaner further includes an main air outlet which is set to correspond to the air inlet of the self-cleaning air passage; the self-cleaning valve is disposed between the air inlet and the air outlet of the self-cleaning air passage, and when the self-cleaning valve is in a first position, the air inlet of the self-cleaning air passage is closed and the main air outlet is opened; when the self-cleaning valve is in a second position, the main air outlet is closed and the air inlet of the self-cleaning air passage is opened; the self-cleaning valve is configured to be selectively switched between the first position and the second position.

Other embodiment of the present application further discloses a vacuum cleaner which includes a self-cleaning air passage and a self-cleaning valve; the self-cleaning air passage is provided with an air inlet for the self-cleaning air passage, the self-cleaning valve is selectively to open or close the air inlet for the self-cleaning air passage; the vacuum cleaner further includes an air supply air passage and an air supply valve; the air supply air passage is provided with a second air inlet valve, and the air supply valve is selectively to open or close the second air inlet; the vacuum cleaner further includes a mode switch mechanism configured to control the self-cleaning valve and the air supply valve; the air supply valve opens the second air inlet before the self-cleaning valve opens the air inlet of the self-cleaning air passage.

Preferably, the self-cleaning valve is configured to close the air inlet of the self-cleaning air passage before the air supply valve closes the second air inlet.

Further, the air supply valve includes a first rotating shaft, a first cover plate portion, and a first transmission portion; the first cover plate portion and the first transmission portion are disposed on two sides of the first rotating shaft; the first cover plate portion is selectively to close the second air inlet; the self-cleaning valve includes a second rotating shaft, a second cover plate portion and a second transmission portion; the second cover plate portion and the second transmission portion are disposed on two sides of the second rotating shaft, and the second cover plate portion is selectively to close the air inlet of the self-cleaning air passage.

Furthermore, the mode switch mechanism includes a rotary button, a rotating shaft mounted under the rotary button, a rotating tooth, a cam, a torsion spring and a first spring, wherein the first spring, the rotating tooth, the cam and a pressing plate are sequentially sleeved on the rotating shaft from top to bottom; in the natural state, the rotating tooth and the cam are not engaged, and the inner surface of the central through hole of the rotating tooth is provided with a limiting structure adapted to the outer surface of the rotating shaft; the bottom surface of the rotating tooth and the top surface of the cam are provided with a matching transmission structure to make the rotating tooth drive the cam to rotate; the cam includes a protrusion, and the torsion spring is mounted on the cam; the bottom of the rotating shaft is configured to engage with or separate from the first transmission portion, to make the air supply valve open or close the second air inlet; the rotating tooth drives the cam to rotate, and the protrusion of the cam is configured to engage with or separate from the second transmission portion to make the self-cleaning valve open or close the air inlet of the self-cleaning air passage.

Furthermore, the bottom surface of the rotating tooth and the top surface of the cam are provided with a matching transmission structure including a first inclined surface, a first contact surface, a second inclined surface and a second contact surface; the first inclined surface is located at the bottom surface of the rotating tooth; the first contact surface is located at the end of the first inclined surface; the second inclined surface is located at the top surface of the cam, and the second contact surface is located at the end of the second inclined surface.

Further, the mode switch mechanism includes a button and a shaft; the shaft is mounted under the button, and the shaft includes a protrusion disposed above the second transmission portion; further, there is included a third spring configured to cause the shaft to have a tendency to move upward; the end of the shaft is configured to engage with or separate from the first transmission portion to control the air supply valve to be opened or closed, and the protrusion is configured to engage with or separate from the second transmission portion to control the self-cleaning valve to be opened or closed.

Further, the button rotates to rotate the protrusion around the shaft, so that the protrusion avoids the second transmission portion.

Furthermore, the self-cleaning valve includes a third rotating shaft, and the second transmission portion is configured to rotate around the third rotating shaft; the self-cleaning valve further includes a limiting portion configured to limits the rotation of the second transmission portion and a fourth spring configured to cause the second transmission portion to have a tendency to abut against the limiting portion; the protrusion is configured to drive the second transmission portion to rotate around the third rotating shaft in one direction, and drive the second transmission portion to drive the self-cleaning valve to rotate around the second rotating shaft in another direction.

Further, the mode switch mechanism includes a driver configured to drive the air supply valve to rotate around the first rotating shaft; the self-cleaning valve includes a third rotating shaft, and the second transmission portion rotates around the third rotating shaft; the self-cleaning valve further includes a limiting portion configured to limit the rotation of the second transmission portion and a fourth spring configured to cause the second transmission portion to abut against the limiting portion; the first transmission portion is configured to drive the second transmission portion to rotate around the third rotating shaft in one direction, and drive the second transmission portion to drive the self-cleaning valve to rotate around the second rotating shaft in another direction.

Further, the driver is a servo motor or a bidirectional rotary electromagnet.

The remarkable technical progresses of the present application mainly include: a self-cleaning system is added to the traditional ash vacuum cleaner enabling it to self-clean the filter; the effective suction time of the ash vacuum cleaner is extended; the self-cleaning effect is superior, and the service life of the filter is prolonged; the self-cleaning system reduces the frequency of the filter disassembly and cleaning, thereby reducing the workload; ingenious concept, simple structure, ease of production, and strong applicability; the external cool air entering from the air supply air passage can cool the driving motor of the fan. The present application is further provided with device for controlling the uncleaning state and the self-cleaning state, which provides extreme ease of operation thereby leading to a better user experience.

DETAILED DESCRIPTION

Figure 1:
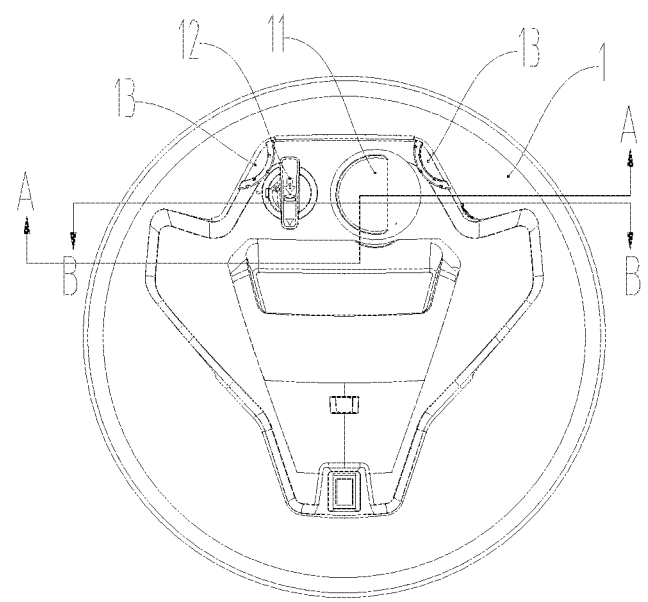
FIG. 1 is a top view of the vacuum cleaner having a self-cleaning function according to the present disclosure.
Figure 2:
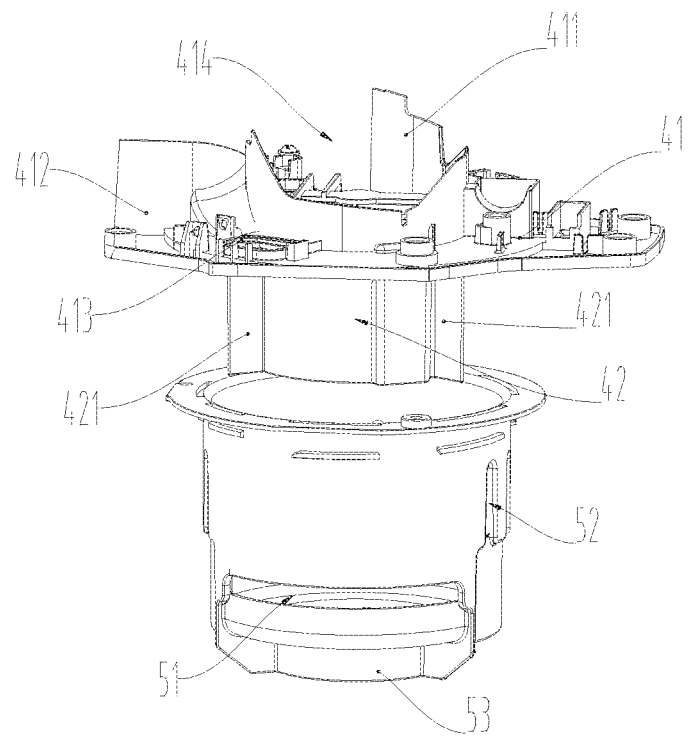
FIG. 2 is a schematic view illustrating the fan cover and the fan mount.
Figure 3:
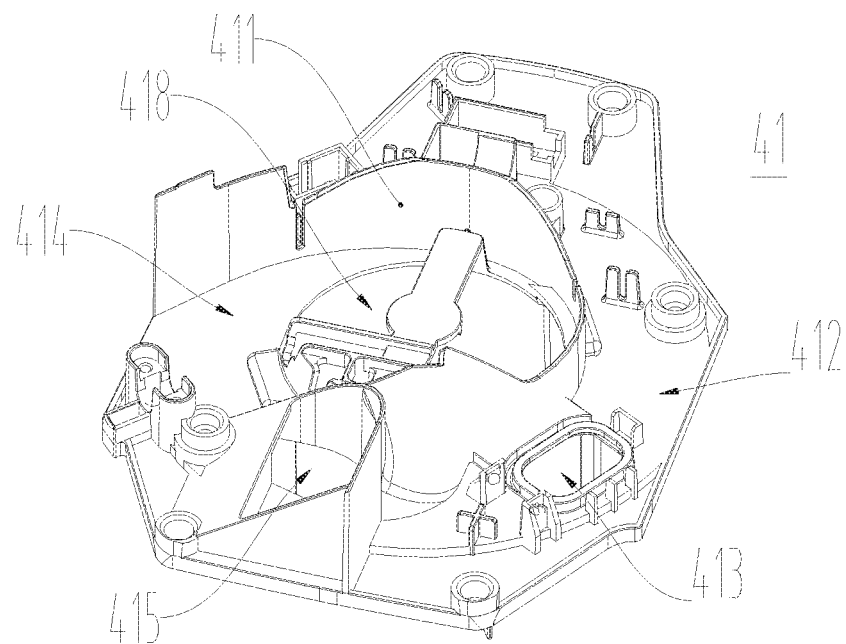
FIG. 3 is a schematic view illustrating the fan cover.
Figure 4:
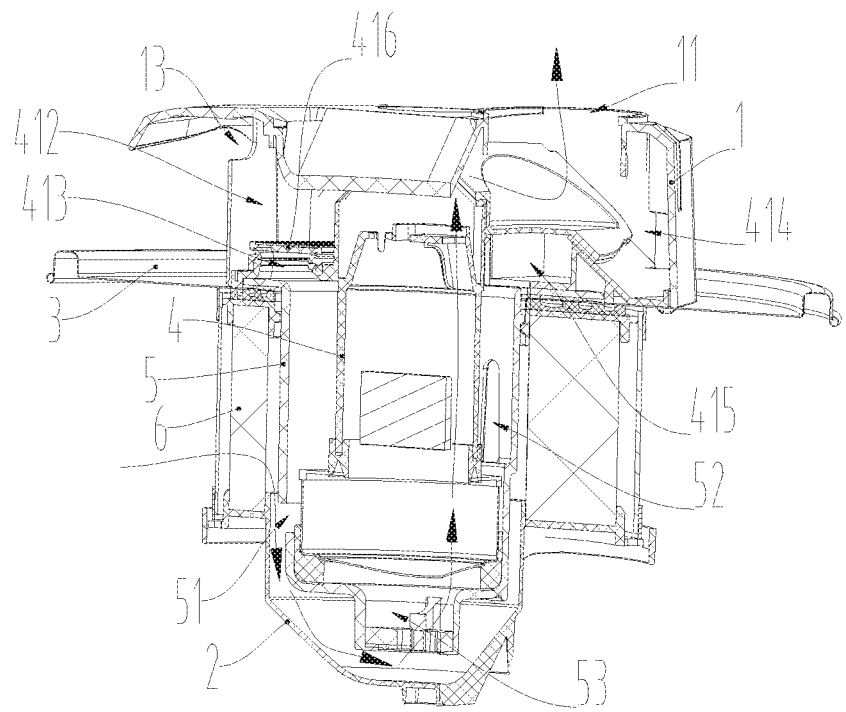
FIG. 4 is a schematic and air passage view illustrating the vacuum cleaner not in the self-cleaning state.

The present disclosure provides a vacuum cleaner having a self-cleaning function, as illustrated in FIGS. 1 to 5. FIG. 3 and FIG. 4 are cross-sectional views, taken along line A-A of FIG. 1, of the vacuum cleaner having the self-cleaning function of the present disclosure. The ash vacuum cleaner includes an upper cover 1, a filter bracket 2, an iron bucket cover 3, a fan cover 4, a fan mount 5 and a filter 6. The upper cover 1 is covered over the fan cover 4, and the filter 6 is fixedly connected to the filter bracket 2. The fan mount 5 is installed inside the filter 6, and the fan mount 5 is provided with a fan inside. The fan cover 4 includes a cover portion 41 and a cylinder portion 42 located inside the fan mount 5 and in communication with the fan. The hood cylinder 42 divides the interior of the fan mount 53 into two mutually isolated portions. The air outlet end of the fan is located inside the cylinder portion 42, and the cover portion 41 is fixedly connected to the fan mount 5. The inside enclosed by the fan cover 4, the filter 6, and the bracket of the filter 5 is a clean space, and the outside is an unclean space, that is, the inside of the filter 6 is a clean side, and the outside of the filter 6 is an unclean side. The upper cover is provided with a main air outlet 11, and the fan cover 4 is provided with a fan cover air outlet 418. The bottom of the fan mount 5 is provided with a fan mount air inlet 53. A gap defined by the inside of the filter 6, the inside of the filter bracket 2 and the outside of the fan mount 5 forms a first air chamber 72. The area formed by the fan to the inner chamber of the fan cylinder 42 is a second air chamber, and the upstream end of the first air chamber 72 communicates with the filter 6, and the downstream end of the first air chamber 72 and the downstream end of the second air chamber communicate with each other via the fan mount air inlet 53.

In addition, the gap formed between the upper cover 1 and the fan cover 4 of the present disclosure is separated to form a third air chamber and a fourth air chamber. The downstream end of the second air chamber communicates with the upstream end of the third air chamber via the fan cover air outlet 418, and the second air chamber and the third air chamber merge with each other to form an air outlet chamber 73, and the downstream end of the third air chamber communicates with the external environment via the main air outlet 11. The upper cover 1 is provided with a first air inlet 13, and the fan cover 4 is provided with a second air inlet 413 and a self-cleaning air passage air inlet 415. The fan mount 5 is provided with an air supply hole 51 and an air blowing hole 52, and the gap 55 between the inner side of the fan mount 5 and the outer side of the cylinder portion 42 is divided into a fifth air chamber and a sixth air chamber. The upstream end of the fourth air chamber communicates with the external environment via the first air inlet 13, and the downstream end of the fourth air chamber communicates with the upstream end of the fifth air chamber via the second air inlet 413. The downstream end of the fifth air chamber communicates with the first air chamber 72 via the air supply hole 51. The upstream end of the sixth air chamber communicates with the second air chamber and the third air chamber via the self-cleaning air passage air inlet 415 and the fan cover air outlet 418. The downstream end of the sixth air chamber communicates with the clean side of the filter 6, and the air blowing hole 52 is located inside the sixth air chamber and facing the clean side of the filter 6. Specifically, the lower end of the filter 6 is mounted at a periphery of the filter bracket 2, and the upper end of the filter is sealingly connected to the lower surface of the iron bucket cover 3 and/or the fan cover 4.

The cover portion 41 is provided with a first baffle 411 configured to divide the space enclosed by the upper cover 1 and a fan cover 41 into a fan cover air inlet area 412 and a fan cover air outlet area 414. The first air inlet 13 and the second air inlet 413 are located in the fan cover air inlet area. The main air outlet 11, the fan cover air outlet 418 and the self-cleaning air passage air inlet 415 are located in the fan cover air outlet area 414. The fan cover air inlet area 412 is the fourth air chamber, and the fan cover air outlet area 414 is the third air chamber.

The cylinder portion 42 is provided with a pair of second baffles 421 configured to separate the space enclosed by the fan mount 5 and the cylinder portion 42 into the air supply area and the air blowing area which are mutually isolated. The air supply hole 51 is located in the air supply area, and the air blowing hole 52 is located in the air blowing area. The air supply area is the fifth air chamber, and the air blowing area is the sixth air chamber.

The air supply hole 51 is adjacent to the fan mount air inlet 53, and is configured for balancing a pressure differential between the inside and the outside of the filter to enhance the self-cleaning effect.

In the suction mode, as illustrated in FIG. 4, the second air inlet 413 is closed, and the self-cleaning air passage air inlet 415 is closed. The airflow enters the air inlet via the vacuum cleaner hose, and enters the first air chamber 72 from the unclean space via the filter 6, then enters the second air chamber via the fan mount air inlet 53, and then driven by the fan blades upward through the fan cover air outlet 418 to enter the third air chamber, and is discharged from the main air outlet 11. The first air chamber 72, the second air chamber and the third air chamber constitute a normal working air passage.

Figure 5:
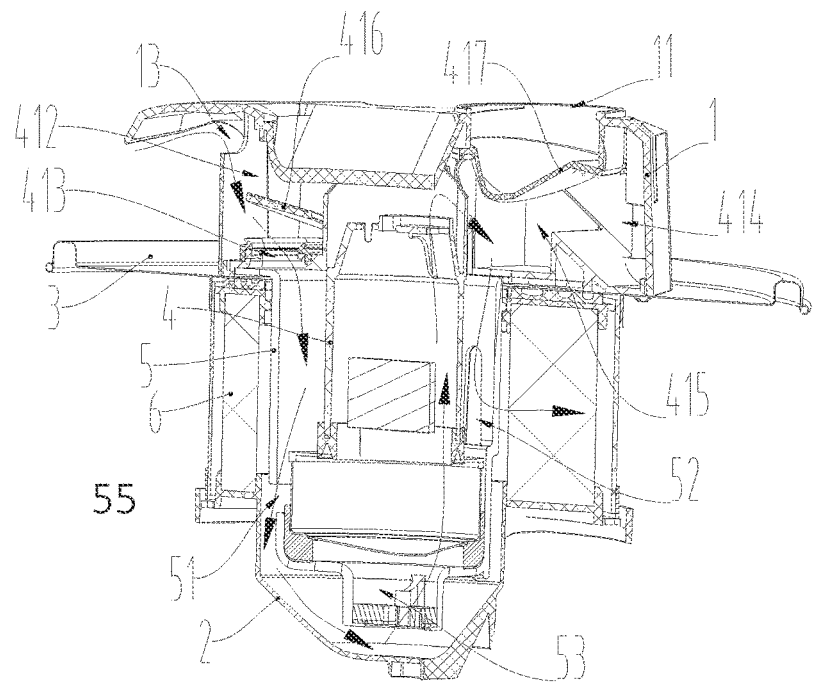
FIG. 5 is a schematic and air passage view illustrating the vacuum cleaner not in the self-cleaning state.

In the self-cleaning mode, as illustrated in FIG. 5, the second air inlet 413 is opened, and the main air outlet 11 is closed. The self-cleaning air passage air inlet 415 is opened, and the vacuum cleaner hose needs to be partially or totally closed to reduce or eliminate the airflow from the unclean space into the clean space through the filter 6. Due to the action of the fan, the air enters the fourth air chamber from the first air inlet 13 and then enters the fifth air chamber via the second air inlet 413, and passes through the first air chamber 72 via the air supply hole 51, and then enter the second air chamber via the fan mount air inlet 53. Since the main air outlet 11 is closed and the self-cleaning air passage air inlet 415 is open, the airflow enters the sixth air chamber via the self-cleaning air passage air inlet 415, and blows the clean side of the filter 6 via the blow hole 52, so that dust, debris or the like adhering to the filter 6 can be cleaned off, realizing self-cleaning of the vacuum cleaner. Between the first air inlet 13 and the air supply hole 51, that is, the combination of the fourth air chamber and the fifth air chamber may be referred to as a supply air passage 75. Certainly, the fourth air chamber and the fifth air chamber may not be provided, and the air supply hole 51 may be directly connected to the external environment via a tube, as long as the airflow enters the second air chamber from the external environment to achieve the air supply function. Between the self-cleaning air passage air inlet 415 and the clean side of the filter 6 through the air blowing hole 52, that is the sixth air chamber referred to as a self-cleaning air passage 74. When the self-cleaning is performed, only the part of the filter 6 corresponding to the air blowing hole 52 can be cleaned, while the other part of the filter 6 corresponding to an air supply air passage cannot be cleaned. In practice, the ratio between the part would be cleaned and the part would not be cleaned can be adjusted according to the actual circumstances. It should be noted herein that although the self-cleaning air passage air inlet 415 is disposed on the fan cover 4, the self-cleaning air passage air inlet 415 is not uniquely disposed, and the self-cleaning air passage air inlet 415 can be disposed on the second air chamber and the third air chamber, and be communicated with the sixth air chamber, as long as the airflow in the second air chamber and the third air chamber can blow to the sixth air chamber. For example, the self-cleaning air passage air inlet 415 can be disposed on the cylinder portion 42 of the sixth air chamber. In particular, in the present embodiment, the self-cleaning air passage air inlet 415 is disposed opposite to the main air outlet 11, and the self-cleaning valve 417 is disposed between the self-cleaning air passage air inlet 415 and the main air outlet 11 to enable the self-cleaning valve 417 can simultaneously control the self-cleaning air passage air inlet 415 and the main air outlet 11. That is, when the self-cleaning valve 417 is in the first position, the self-cleaning air passage air inlet 415 is closed and the main air outlet 11 is opened. When the self-cleaning valve 417 is in the second position, the main air outlet 11 is closed and the self-cleaning air passage air inlet 415 is opened. The self-cleaning valve 417 is configured to be selectively switched between the first position and the second position.

The self-cleaning method of the vacuum cleaner filter of the present disclosure includes the following steps: ① open the air supply valve 416 to allow the airflow to enter the air supply air passage 75; ② open the self-cleaning valve 417 to allow the airflow to enter the self-cleaning air passage 74, and close the main air outlet 11; ③ close the self-cleaning valve 417, and open the main air outlet 11; ④ and close the air supply valve 416. Preferably, steps ② and ③ are repeated at least twice between the steps ① and ④. Preferably, the vacuum cleaner air inlet is at least partially closed before or after the step ①, and the closing of the vacuum cleaner air inlet is released before or after said step ④.

Figure 16:
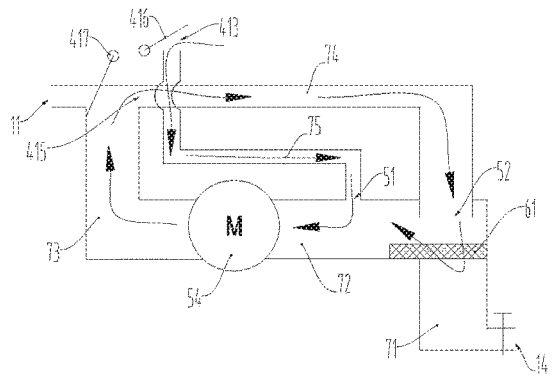
FIG. 16 is a simplified schematic view illustrating the vacuum cleaner of the present disclosure (self-cleaning mode)
Figure 14:
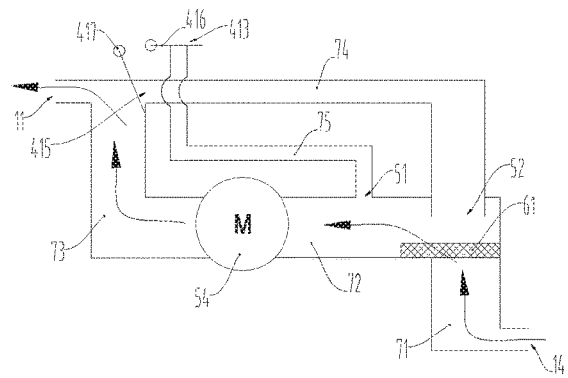
FIG. 14 is a simplified schematic view illustrating the vacuum cleaner of the present disclosure (suction mode)
Figure 15:
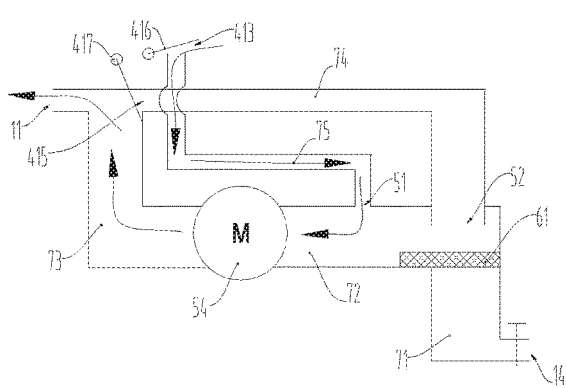
FIG. 15 is a simplified schematic view illustrating the vacuum cleaner of the present disclosure (intermediate state in which the suction mode is switched to the self-cleaning mode)

The vacuum cleaner of the present disclosure and operation method thereof will be described in simplified schematic diagrams. FIG. 14 is a simplified schematic diagram of the vacuum cleaner in the suction mode, wherein the air inlet 14 and the main air outlet 11 are both in the open state. The self-cleaning valve 417 closes the self-cleaning air passage air inlet 415, and the air supply valve 416 closes the second air inlet 413 (i.e., the air inlet of the air supply air passage 75). Due to the action of the fan 54, the air enters the unclean air chamber 71 via the air inlet 14, and debris or dust in the air are caught by the filter, and most of the debris or dust can fall into the unclean air chamber 71. However, some debris and dust will stick on the unclean side of the filter, and the clean air passes through the filter, and sequentially passes through the first air chamber 72, the outlet air chamber 73, and is finally discharged from the main air outlet 11, and the arrows in the figure schematically indicate the directions of the airflow. As the vacuum cleaner is used for a period of time, debris and dust would accumulate on the unclean side of the filter, causing the suction power of the vacuum cleaner to decrease. When the user directly feels that the suction power is decreased, or the vacuum cleaner itself detects an excessive accumulation of debris and dust via the sensor, it is necessary to activate the self-cleaning mode to remove the debris and dust accumulated on the unclean side of the filter. The activation of the self-cleaning mode can be realized by the user operating the mode switch mechanism, or can be realized by the automatic mode switching structure provided in the vacuum cleaner, and the specific embodiment is also described in the present disclosure. FIG. 15 is a simplified schematic diagram illustrating an intermediate state wherein the vacuum cleaner is switched from the suction mode to the self-cleaning mode. The air inlet 14 is in a closed or semi-closed state, and the main air outlet 11 is in the open state. The self-cleaning valve 417 closes the self-cleaning air passage air inlet 415, and the air supply valve 416 is opened. Due to the action of the fan 54, the air enters the air supply air passage 75 from the second air inlet 413, and enters the first air chamber 72 through the air inlet 51, and then passes through the air outlet chamber 73, and is finally discharged from the main air outlet 11. The arrows in the figure schematically indicate the directions of the airflow. At this moment, a low pressure area is formed inside the self-cleaning air passage 74 and the unclean air chamber 71. FIG. 16 is a simplified schematic diagram illustrating the vacuum cleaner in the self-cleaning mode. The air inlet 14 and the main air outlet 11 are both in the closed state; the self-cleaning valve 417 opens the self-cleaning air passage air inlet 415; and the air supply valve 416 remains open. At this moment, the air from the air supply air passage 75 enters the self-cleaning air passage 74 via the air outlet chamber 73 under the action of the fan 54 and is ejected from the air blowing hole 52 on the clean side of the corresponding filter to impact the clean side of the filter to cause the debris and dust accumulated on the unclean side of the filter to fall off to complete a self-cleaning action. In order to enhance the self-cleaning effect, that is, the air supply valve 416 is kept open, and the self-cleaning air passage air inlet 415 is closed and the main air outlet 11 is open, and then the vacuum cleaner returns from the intermediate state to the self-cleaning mode. Such a self-cleaning action is repeated several times. Finally, the vacuum cleaner returns to the suction mode from the intermediate state or self-cleaning mode to complete the self-cleaning action.

The disclosure further discloses a vacuum cleaner, as illustrated in FIG. 14-FIG. 16, including a self-cleaning air passage 74 and a self-cleaning valve 417. The self-cleaning air passage 74 is provided with the self-cleaning air passage air inlet 415, the self-cleaning valve 417 is configured to selectively open or close the self-cleaning air passage air inlet 415. The vacuum cleaner further includes an air supply air passage 75 and an air supply valve 416. The air supply air passage 75 is provided with the second air inlet 413, and the air supply valve 416 selectively open or close the second air inlet 413. The air supply valve 416 opens the second air inlet 413 before the self-cleaning valve 417 opens the self-cleaning air passage the air inlet 415; and the self-cleaning valve 417 closes the self-cleaning air passage air inlet 415 before the air supply valve 416 closes the second air inlet 413.

The disclosure further discloses a vacuum cleaner, including a self-cleaning air passage 74 and a self-cleaning valve 417. The self-cleaning air passage 74 is provided with the self-cleaning air passage air inlet 415, the self-cleaning valve 417 is configured to selectively open or close the self-cleaning air passage air inlet 415. The vacuum cleaner further includes an air supply air passage 75 and an air supply valve 416. The air supply air passage 75 is provided with the second air inlet 413, and the air supply valve 416 selectively open or close the second air inlet 413. The vacuum cleaner further includes a mode switch mechanism that is configured to control the self-cleaning valve 417 and the air supply valve 416. The air supply valve 416 opens the second air inlet 413 before the self-cleaning valve 417 opens the self-cleaning air passage the air inlet 415; and the self-cleaning valve 417 closes the self-cleaning air passage air inlet 415 before the air supply valve 416 closes the second air inlet 413.

In the present specific embodiment, the air supply valve 416 includes a first rotating shaft 811, a first cover plate portion 812 and a first transmission portion 813. The first cover plate portion 812 and the first transmission portion 813 are disposed oppositely on two sides of the first rotating shaft 811, and the first cover plate portion 812 selectively closes the second air inlet 413. The self-cleaning valve 417 includes a second rotating shaft 821, a second cover plate portion 824 and a second transmission portion 823. The second cover plate portion 824 and the second transmission portion 823 are disposed on two sides of the second rotating shaft 821, and the second cover plate portion 823 selectively closes the self-cleaning air passage air inlet 415.

Embodiment 1

As illustrated in FIG. 6-FIG. 9 and FIG. 24-FIG. 31, the mode switch mechanism includes a rotary button 121, a rotating shaft 120 mounted under the rotary button 121, a rotating tooth 123, a cam 127, a torsion spring 124, a pressing plate 125 and a first spring 126, and the first spring 126, the rotating tooth 123, the cam 127, and the pressing plate 125 are sequentially sleeved on the rotating shaft 120 from top to bottom. In a natural state, the rotating tooth 123 and the cam 127 are not engaged, and the inner surface of the central through hole of the rotating tooth 123 is provided with a limiting structure adapted to the outer surface of the rotating shaft 120. The bottom surface of the rotating tooth 123 and the top surface of the cam 127 are provided with a matching transmission structure to make the rotating tooth 123 drive the cam 127 to rotate. The cam 127 includes a protrusion 130, and the torsion spring 124 is mounted on the cam 127. The bottom of the rotating shaft 120 selectively engages with or separates from the first transmission portion 813, to make the air supply valve 416 open or close the second air inlet 413. The rotating tooth 123 drives the cam 127 to rotate, and the protrusion 130 of the cam 127 engage with or separates from the second transmission portion 823 to make the self-cleaning valve 417 open or close the self-cleaning air passage air inlet 415. The bottom surface of the rotating tooth 123 and the top surface of the cam 127 are provided with a matching transmission structure including a first inclined surface 1231, a first contact surface 1232, a second inclined surface 1271 and a second contact surface 1272. The first inclined surface 1231 is located at a bottom surface of the rotating tooth 123; the first contact surface 1232 is located at an end of the first inclined surface 1231; the second inclined surface 1271 is located at a top surface of the cam 127, and the second contact surface 1272 is located at an end of the second inclined surface 1271. The cam 127 is provided with the protrusion 130 that is engaged with or separated from the second transmission portion 823, thereby controlling the opening or closing of the self-cleaning valve 417. The torsion spring 124 is mounted on the cam 127, and a second compression spring is mounted below the air supply valve 51 to reset the air supply valve 51. Certainly, the air supply valve 51 may also be mounted with other types of elastic members or without any elastic members, as long as the air supply valve 51 can close the air supply air passage 75 without being subjected to other external forces.

Figure 6:
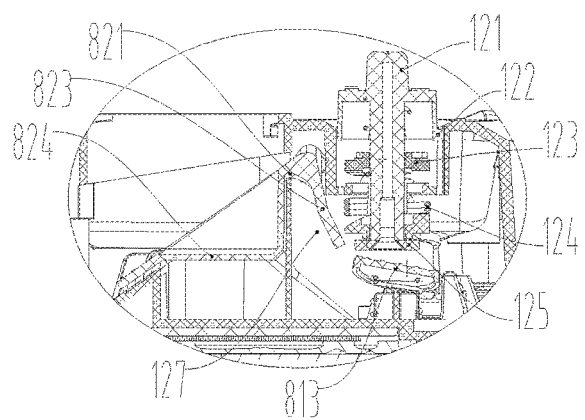
FIG. 6 is a schematic view illustrating the self-cleaning controller for the vacuum cleaner not in the self-cleaning state.
Figure 7:
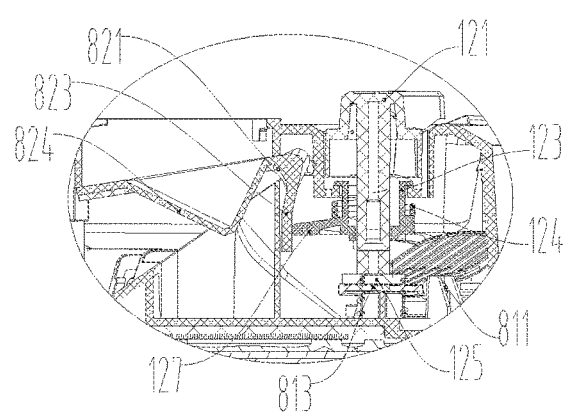
FIG. 7 is a schematic view illustrating the self-cleaning controller for the vacuum cleaner not in the self-cleaning state.
Figure 8:
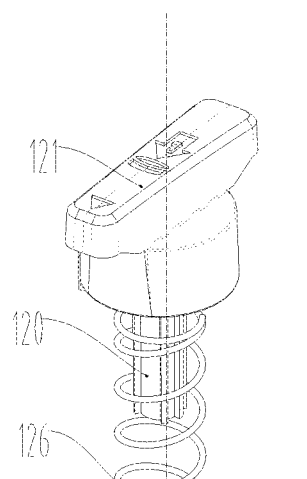
FIG. 8 is an exploded view of the first embodiment of the mode switch mechanism.

As illustrated in FIGS. 6 and 7, in the present embodiment, the self-cleaning valve 417 is substantially L-shaped. The second cover portion 824 is located above the self-cleaning air passage air inlet 415 and below the main air outlet 11, and selectively covers the self-cleaning air passage air inlet 415 or the main air outlet 11. And the second transmission portion 823 faces toward the direction where the cam 127 is located. Certainly, an elastic member for resetting may also be mounted on the self-cleaning valve 417. In the present embodiment, since a covering portion of the self-cleaning valve 417 is relatively thick and heavy and the tail portion is relatively thin and light, the self-cleaning valve 417 naturally closes the self-cleaning air passage 74 without external forces, therefore, no elastic parts are installed. Due to the action of the bottom second spring, the first cover plate portion 811 is pressed downward, and is located above the second air inlet 413 for covering the second air inlet 413; the first transmission portion 813 is tilted upwards and is located below the bottom of the rotating shaft 120 for being pressed by the rotating shaft 120 to cause the first transmission portion 813 to press downward; and the first cover plate portion 811 covering the second air inlet 413 is tilted up to facilitate opening the second air inlet 413. The specific operation process is as follows:

First, press downward the rotary button 121, on the one hand, make the pressing plate 125 press down the first transmission portion 813, so that the air supply valve 416 is in a substantially horizontal state, and the first cover plate portion 811 does not completely cover the second air inlet 413, and then the air supply valve 416 opens the air supply air passage 75; on the other hand, the first inclined surface 1231 of the rotating tooth 123 and the second inclined surface 1271 of the cam 127 abut against each other.

Then, the rotary button 121 is rotated clockwise, and the rotating shaft 120 drives the rotating tooth 123 to rotate clockwise. When the first contact surface 1232 of the rotating tooth 123 and the second contact surface 1272 of the cam 127 abut against each other, the rotating tooth 123 drives the cam 127 to rotate clockwise, and the protrusion 130 of the cam 127 pushes the second transmission portion 823 outward, so that the second cover plate portion 824 is tilted upward to open the self-cleaning air passage 74 and simultaneously close the main air outlet 11.

Then, after a certain angle of rotation, the protrusion 130 of the cam 127 is restricted by the second transmission portion 823 so that the cam 127 cannot continue to rotate. Continue to rotate the rotary button 121 clockwise to overcome the maximum static friction between the first contact surface 1232 and the second contact surface 1272, and the first and second contact surfaces are disengaged, at this moment, the rotating tooth 123 is slightly lifted up and then continue to rotate clockwise. Since losing the rotational torque provided by the rotating tooth 123, the cam 127 rotates counterclockwise to return to the original position due to the action of the torsion spring 124, at this moment, the self-cleaning valve 417 closes the self-cleaning air passage 74, and simultaneously opens the main air outlet 11.

Then, continue to rotate the rotary button clockwise, when the first contact surface 1231 and the second contact surface 1271 are re-abut against each other, repeat the above process until the self-cleaning is completed, and then the rotary button 121 is released, due to the action of the first spring 126, a self-cleaning control device 12 is bounced up, and the pressing plate 125 is separated from the first transmission portion 813 and the air supply air passage 75 is closed; in the self-cleaning process, the air supply air passage 75 is always open, and the self-cleaning air passage 74 is sequentially opened, closed, and opened and circulate in order to perform multiple self-cleaning operations.

After the self-cleaning work is completed, rotate the rotary button 121 to close the self-cleaning valve 417; stop pressing the rotary button 121, and the rotary button 121 is reset due to the elastic force of the first spring 126, and the air supply valve 416 is closed.

Figure 9:
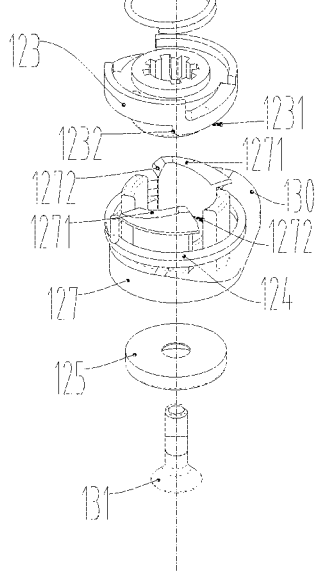
FIG. 9 is a schematic view illustrating the upper cover.

Further, the first contact surface 1232 and the second contact surface 1272 are disposed as inclined surfaces to facilitate the separation of the first contact surface 1232 and the second contact surface 1272. The limiting structure of the inner surface of the central through hole of the rotating tooth 123 and the limiting structure of the outer surface of the rotating shaft 120 are designed to be non-central symmetrical structures along the axis, so that the rotating tooth 123 can be adapted and engaged with the rotating shaft 120 in a preset direction. Specifically, the limiting structure of the outer surface of the rotating shaft 120 is a protruding rib, and the limiting structure of the inner surface of the central through hole of the rotating tooth 123 is a groove; or the limiting structure of the outer surface of the rotating shaft 120 is the groove, and the limiting structure of the inner surface of the central through hole of the rotating tooth 123 is the protruding rib. The inner diameter of the central through hole of the cam 127 is larger than the maximum outer diameter of the rotating shaft 120 (including the rib) so that the cam 127 does not rotate with the rotation of the rotating shaft. As illustrated in FIG. 9, the upper cover 1 is provided with a rotary button hole, and the rotary button hole is provided with a guiding groove 129 and a guiding spiral 128. The rotary button 121 is mounted inside the rotary button hole and is connected to the guiding groove 129 and the guiding spiral 128.

Embodiment 2

As illustrated in FIGS. 10-13, the mode switch mechanism includes a button and a shaft. The shaft is mounted under the button, and the shaft includes a protrusion 130 located above the second transmission portion 823. Further, a third spring that causes the shaft to have an upward motion tendency is included. The end of the shaft engages with or separates from the first transmission portion 813 to control the air supply valve 416 to open or close, and the protrusion 130 engages with or separates from the second transmission portion 823 to control the self-cleaning valve 417 to open or close. The air supply valve 416 has a tendency to close the air supply air passage 75, so that the self-cleaning valve 417 has a tendency to close the self-cleaning air passage 74. Such a tendency can be achieved by employing the elastic member, or by adjusting the center of gravity of the structure of the air supply valve 416 and the self-cleaning valve 417.

Figure 10:
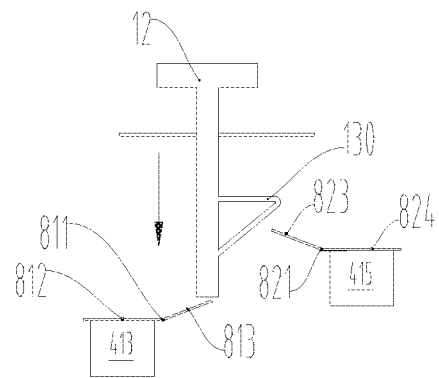
FIG. 10 is a schematic view illustrating the first embodiment of the self-cleaning controller of the vacuum cleaner when the air supply valve and the self-cleaning valve are not open.
Figure 11:
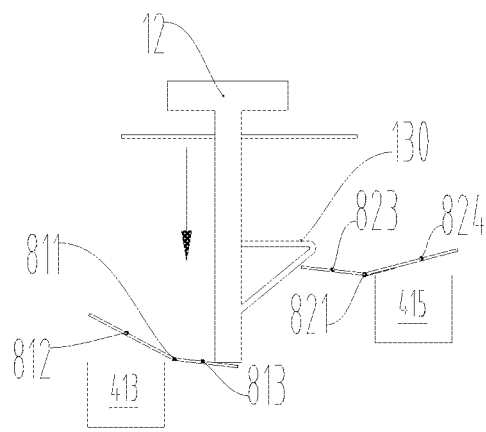
FIG. 11 is a schematic view illustrating the first embodiment of the self-cleaning controller of the vacuum cleaner when only the air supply valve is open.
Figure 12:
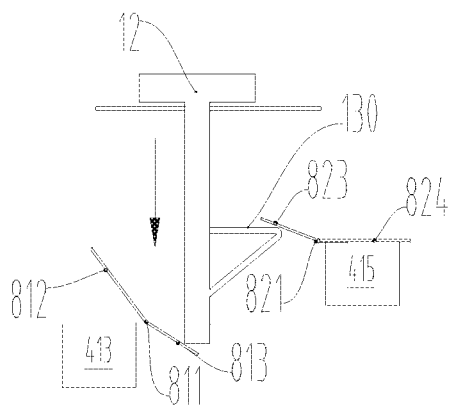
FIG. 12 is a schematic view illustrating the self-cleaning controller of the vacuum cleaner when the air supply valve and the self-cleaning valve are not open.
Figure 13:
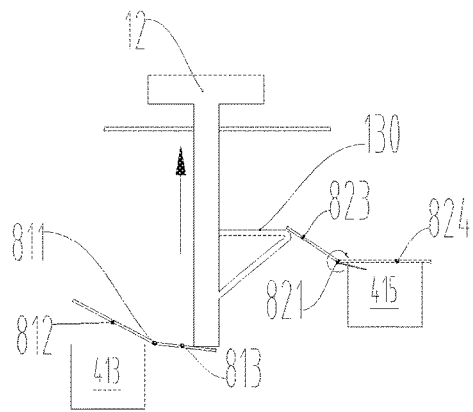
FIG. 13 is a schematic view illustrating the second embodiment of the self-cleaning controller of the vacuum cleaner when reset.

As illustrated in FIG. 10, when the vacuum cleaner is in the suction mode, both the air supply valve 416 and the self-cleaning valve 417 are in the closed state. Press downward the button, and the end of the shaft first abuts against the first transmission portion 813, so that the air supply valve 416 is opened first. As illustrated in FIG. 11, press downward the button, and the end of the shaft continues to press downward the first transmission portion 813 to keep the air supply valve 416 open. The protrusion 130 abuts against the second transmission portion 823 to delay opening the self-cleaning valve 417. As illustrated in FIG. 12, press downward the button, and the end of the shaft continues to press downward the first transmission portion 813 to keep the air supply valve 416 open. The protrusion 130 passes over the second transmission portion 823 and the self-cleaning valve 417 is closed. As illustrated in FIG. 13, the button is released or lifted up and the air supply valve 416 is delayed to close to complete a self-cleaning process. In order to enhance the self-cleaning effect, the above self-cleaning processes can be circulated.

In the present embodiment, the button is the rotary button 121 as in the first embodiment. The protrusion 130 is rotated about the button shaft by rotating the rotary button 121, and avoids the second transmission portion 823, so that the protrusion 130 can pass over the second transmission portion 823 from the bottom thereof to the top.

In order to increase the airtightness of the air circulation of the self-cleaning system, sealing members are disposed between the second air inlet 413 and the air supply valve 416 and between the self-cleaning air passage air inlet 415 and the self-cleaning valve 417.

Embodiment 3

Figure 33:
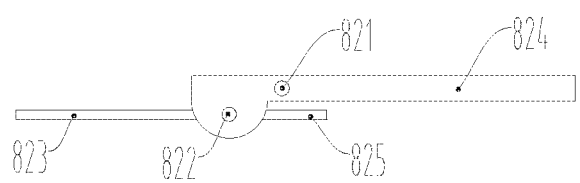
FIG. 33 illustrates another embodiment of the self-cleaning valve in the mode switch mechanism.

The difference between the present embodiment and embodiment 2 is that, as illustrated in FIG. 33, the self-cleaning valve 417 further includes a third rotating shaft 822 disposed at one end of the second cover plate portion 824 and a limiting portion 825 extending from the second transmission portion 823. The second transmission portion 823 and the second cover plate portion 824 are pivotally connected to the third rotating shaft 822, and the second transmission portion 823 and the limiting portion 825 are respectively disposed on two sides of the third rotating shaft 822. A fourth spring that causes the limiting portion 825 to have a tendency to abut against the second cover plate portion 824 is mounted on the third rotating shaft 822. When the protrusion 130 abuts against the second transmission portion 823 from above, the second transmission portion 823 is rotated downward, and since the limiting portion 825 abuts against the second cover plate portion 824 upward, the entire self-cleaning valve 417 is rotated counterclockwise about the second rotating shaft 821, and the self-cleaning valve 417 is opened. When the protrusion 130 abuts against the second transmission portion 823 from the bottom, since the second cover plate portion 824 abuts against the self-cleaning air passage outlet downward, keep the self-cleaning air passage air inlet 415 closed, and the second transmission portion 823 rotates clockwise around the third rotating shaft 822 until the protrusion 130 passes over the second transmission portion 823 from the bottom to the top thereof, and the second transmission portion 823 is reset under the action of the fourth spring.

Embodiment 4

Figure 32:
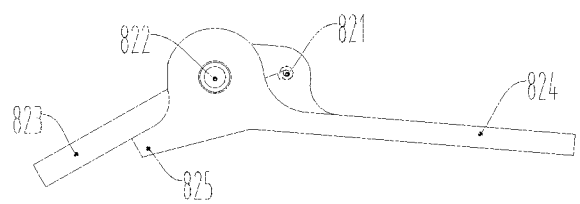
FIG. 32 illustrates an embodiment of a self-cleaning valve in the mode switch mechanism.

As illustrated in FIG. 17-FIG. 23, the mode switch mechanism includes a driver 80 that drives the air supply valve 416 to rotate around the first rotating shaft 811. As illustrated in FIG. 32, the self-cleaning valve 417 includes a third rotating shaft 822, and the second transmission portion 823 rotates around the third rotating shaft 822. The self-cleaning valve 417 further includes a limiting portion 825 that limits rotation of the second transmission portion 823 and a fourth spring that causes the second transmission portion 823 to abut against the limiting portion 825. The first transmission portion 813 drives the second transmission portion 823 to rotate around the third rotating shaft 822 in one direction, and the first transmission portion 813 drives the second transmission portion 823 to drive the self-cleaning valve 417 to rotate around the second rotating shaft 821 in another direction. Specifically, the driver 80 is a servo motor or a bidirectional rotary electromagnet.

Figure 17:
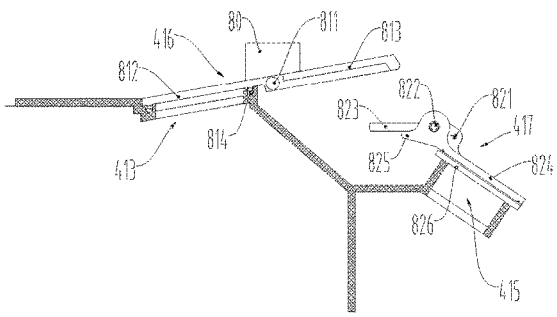
FIG. 17 is a schematic view illustrating the third embodiment the self-cleaning controller of the vacuum cleaner when in the first state.
Figure 18:
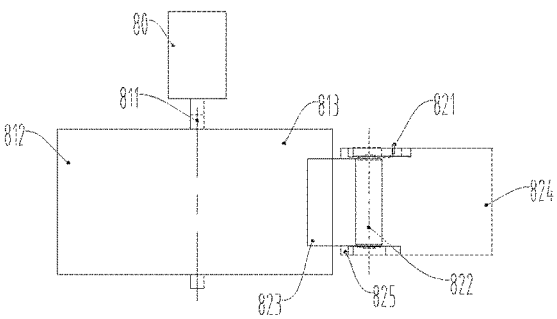
FIG. 18 is a top view of FIG. 17.
Figure 19:
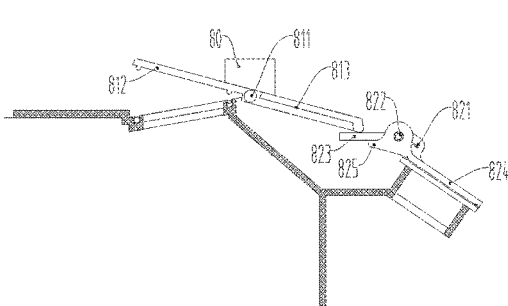
FIG. 19 is a schematic view illustrating the second state of the third embodiment of the self-cleaning controller of the vacuum cleaner.
Figure 20:
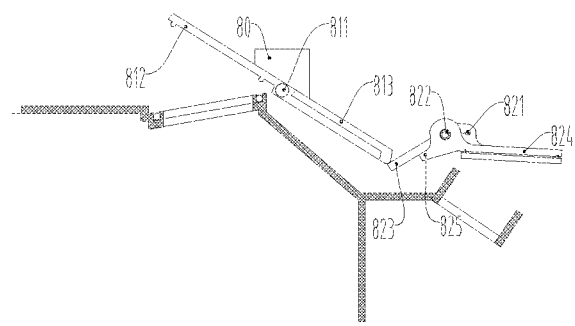
FIG. 20 is a schematic view illustrating the third state of the third embodiment of the self-cleaning controller of the vacuum cleaner.
Figure 24:
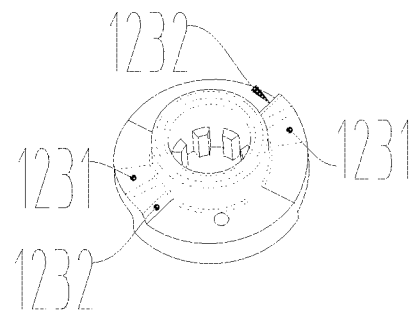
FIG. 24 is an axonometric view (with bottom facing upward) illustrating a rotating tooth in the first embodiment of the mode switch mechanism.
Figure 21:
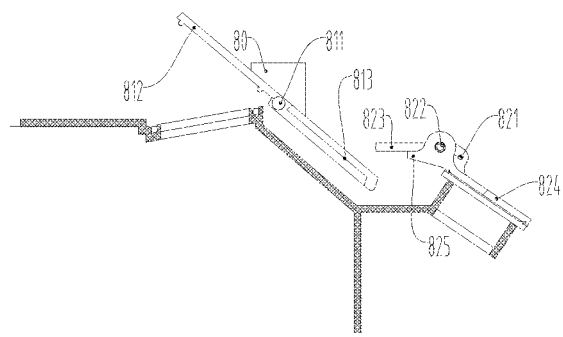
FIG. 21 is a schematic view illustrating the fourth state of the third embodiment of the self-cleaning controller of the vacuum cleaner.
Figure 25:
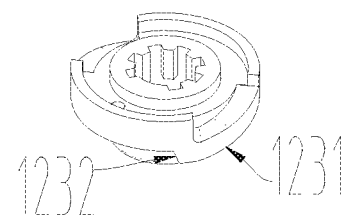
FIG. 25 is an axonometric view (with bottom facing downward) illustrating the rotating tooth in the first embodiment of the mode switch mechanism.
Figure 26:
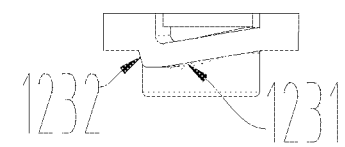
FIG. 26 is a front view of the rotating tooth in the first embodiment of the mode switch mechanism.
Figure 22:
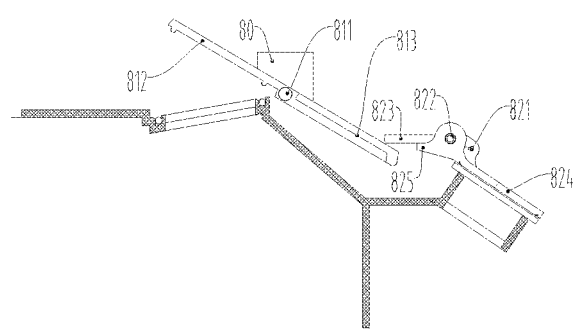
FIG. 22 is a schematic view illustrating the fifth state of the third embodiment of the self-cleaning controller of the vacuum cleaner.
Figure 27:
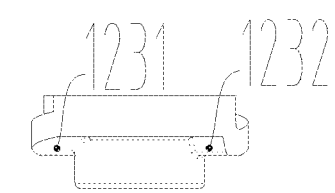
FIG. 27 is a side view of the rotating tooth in the first embodiment of the mode switch mechanism.
Figure 23:
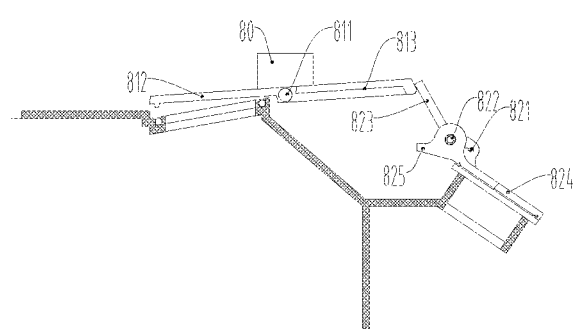
FIG. 23 is a schematic view illustrating the sixth state of the third embodiment of the self-cleaning controller of the vacuum cleaner.
Figure 28:
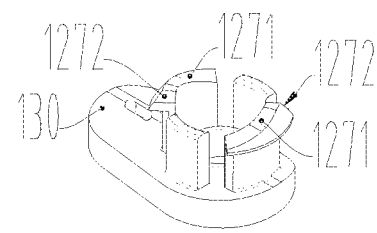
FIG. 28 is an axonometric view illustrating a cam in the first embodiment of the mode switch mechanism.
Figure 29:
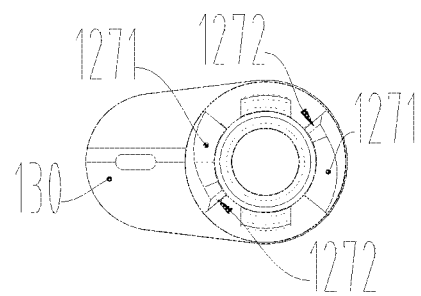
FIG. 29 is a top view illustrating the cam in the first embodiment of the mode switch mechanism.
Figure 30:
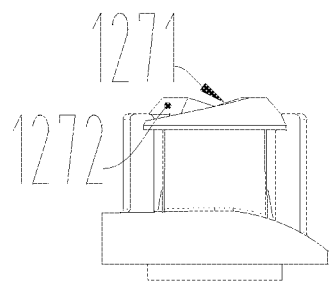
FIG. 30 is a front view of the cam in the first embodiment of the mode switch mechanism.
Figure 31:
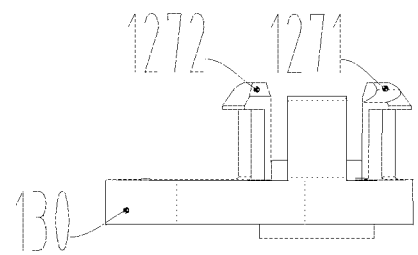
FIG. 31 is a side view of the cam in the first embodiment of the mode switch mechanism.

As illustrated in FIG. 17 and FIG. 18, when the vacuum cleaner is in the suction state, the air supply valve 416 closes the second air inlet 413, and the self-cleaning valve 417 closes the self-cleaning air passage air inlet 415. As illustrated in FIG. 19, the driver 80 drives the air supply valve 416 to rotate clockwise to open the second air inlet 413, and the first transmission portion 813 abuts against the second transmission portion 823 downward. As shown in FIG. 20, the driver 80 continues to drive the air supply valve 416 to rotate clockwise, and the second air inlet 413 remains open; the first transmission portion 813 presses downward the second transmission portion 823, since the second transmission portion 823 abuts against the limiting portion 825 downward, the self-cleaning valve 417 is rotated counterclockwise, and the self-cleaning air passage air inlet 415 is open. As illustrated in FIG. 21, the driver 80 continues to drive the air supply valve 416 to rotate clockwise, and the second air inlet 413 remains open. The first transmission portion 813 passes over the second transmission portion 823 from the top thereof to the bottom, and the second transmission portion 823 is reset under the action of the fourth spring and the self-cleaning valve 417 closes the self-cleaning air passage inlet 415 due to the loss of external force. As illustrated in FIG. 22, when the air supply valve 416 is rotated clockwise to the maximum angle, the driver 80 drives the air supply valve 416 to rotate counterclockwise, and the first transmission portion 813 abuts against the second transmission portion 823 upward. As illustrated in FIG. 23, the driver 80 continues to drive the air supply valve 416 to rotate counterclockwise, since the second cover plate portion 824 abuts against the self-cleaning air passage air inlet, and the self-cleaning air passage air inlet 415 is closed, the second transmission portion 823 rotates clockwise around the third rotating shaft 822 under the action of the first transmission portion 813. The driver 80 continues to drive the air supply valve 416 to rotate counterclockwise, and the first transmission portion 813 passes over the second transmission portion 823 from the bottom thereof to the top. The second transmission portion is reset under the action of the fourth spring, and finally the air supply valve 416 closes the second air inlet 413 to complete the self-cleaning process. In order to enhance the self-cleaning effect, the above self-cleaning processes can be repeated.

In other embodiments, the self-cleaning valve 417 may select the structure as the embodiment 3.

Further, in the present embodiment, an outer edge of the second air inlet 413 is provided with a groove provided with a first sealing member 814, and the first cover plate portion 812 is provided with a protrusion corresponding to the groove. The second cover plate 824 is provided with a second sealing member 826 corresponding to one side of the self-cleaning air passage air inlet 415.

We claim:

1. A vacuum cleaner comprising:
   an air inlet, a filter, a fan, and a main air outlet, the filter having a clean side and an unclean side;
   an unclean air chamber being located between the air inlet and the unclean side of the filter,
   a first air chamber being located between the clean side of the filter and the fan;
   an air outlet chamber being located between the fan and the main air outlet, wherein an upstream end of the air outlet chamber is connected to the first air chamber;
   when the vacuum cleaner is in a suction mode, an airflow enters the vacuum cleaner from an external environment via the air inlet under the action of the fan, and sequentially passes through the unclean air chamber, the filter, the first air chamber and the air outlet chamber, and then is discharged via the main air outlet to the external environment which communicates with the main air outlet;
   a self-cleaning air passage and an air supply air passage are located so that an upstream end of the self-cleaning air passage is communicated to the air outlet chamber, and a downstream end of the self-cleaning air passage is communicated to a clean side of the filter; and
   the upstream end of the air supply air passage being in direct airflow communication with the external environment, a downstream end of the air supply air passage being in airflow communication with the first air chamber; and
   a fan cover and a fan mount, the fan cover including a cover portion and a cylinder portion which is disposed inside the fan mount, a gap located between the fan mount and the cylinder portion being separated to form a fifth air chamber and a sixth air chamber, and the air outlet chamber being in communication with an air inlet for the self-cleaning air passage, an upstream end of the sixth air chamber communicating with the air outlet chamber via an air inlet of the self-cleaning air passage, and a downstream end of the sixth air chamber communicates with the clean side of the filter, wherein the cylinder portion includes a pair of second baffles configured to separate the gap between the fan mount and the cylinder portion to form the fifth air chamber and sixth air chamber.

2. A vacuum cleaner in accordance with claim 1, wherein when in self-cleaning mode, the main air outlet is closed, and the entire airflow between the fan and the main air outlet can flow to a partial clean side of the filter, and when in self-cleaning mode, the air inlet is at least partially closed.

3. A vacuum cleaner comprising:
   an air inlet, a filter, a fan, and a main air outlet, the filter having a clean side and an unclean side;
   an unclean air chamber being located between the air inlet and the unclean side of the filter,
   a first air chamber being located between the clean side of the filter and the fan;
   an air outlet chamber being located between the fan and the main air outlet, wherein an upstream end of the air outlet chamber is connected to the first air chamber;
   when the vacuum cleaner is in a suction mode, an airflow enters the vacuum cleaner from an external environment via the air inlet under the action of the fan, and sequentially passes through the unclean air chamber, the filter, the first air chamber and the air outlet chamber, and then is discharged via the main air outlet to the external environment which communicates with the main air outlet;
   a self-cleaning air passage and an air supply air passage are located so that an upstream end of the self-cleaning air passage is communicated to the air outlet chamber, and a downstream end of the self-cleaning air passage is communicated to a clean side of the filter; and
   the upstream end of the air supply air passage being in direct airflow communication with the external environment, a downstream end of the air supply air passage being in airflow communication with the first air chamber;
   a fan cover and a fan mount, the fan cover including a cover portion and a cylinder portion which is disposed inside the fan mount, a gap located between the fan mount and the cylinder portion being separated to form a fifth air chamber and a sixth air chamber, and the air outlet chamber being in communication with an air inlet for the self-cleaning air passage, an upstream end of the sixth air chamber communicating with the air outlet chamber via an air inlet of the self-cleaning air passage, and a downstream end of the sixth air chamber communicates with the clean side of the filter, wherein the fan mount defines a blow hole communicating with the clean side of the filter, wherein the airflow in the sixth air chamber can blow to the clean side of the filter via the blow hole.

4. A vacuum cleaner in accordance with claim 3, wherein when in self-cleaning mode, the main air outlet is closed, and the entire airflow between the fan and the main air outlet can flow to a partial clean side of the filter, and when in self-cleaning mode, the air inlet is at least partially closed.

5. A vacuum cleaner comprising:
an air inlet, a filter, a fan, and a main air outlet, the filter having a clean side and an unclean side;
an unclean air chamber being located between the air inlet and the unclean side of the filter,
a first air chamber being located between the clean side of the filter and the fan;
an air outlet chamber being located between the fan and the main air outlet, wherein an upstream end of the air outlet chamber is connected to the first air chamber;
when the vacuum cleaner is in a suction mode, an airflow enters the vacuum cleaner from an external environment via the air inlet under the action of the fan, and sequentially passes through the unclean air chamber, the filter, the first air chamber and the air outlet chamber, and then is discharged via the main air outlet to the external environment which communicates with the main air outlet;
a self-cleaning air passage and an air supply air passage are located so that an upstream end of the self-cleaning air passage is communicated to the air outlet chamber, and a downstream end of the self-cleaning air passage is communicated to a clean side of the filter; and
the upstream end of the air supply air passage being in direct airflow communication with the external environment, a downstream end of the air supply air passage being in airflow communication with the first air chamber;
a fan cover and a fan mount, the fan cover including a cover portion and a cylinder portion which is disposed inside the fan mount, a gap located between the fan mount and the cylinder portion being separated to form a fifth air chamber and a sixth air chamber, and the air outlet chamber being in communication with an air inlet for the self-cleaning air passage, an upstream end of the sixth air chamber communicating with the air outlet chamber via an air inlet of the self-cleaning air passage, and a downstream end of the sixth air chamber communicates with the clean side of the filter; and
a filter bracket, the fan being disposed inside the fan mount, the first air chamber being defined by a gap surrounded by the filter, the inner side of the filter bracket, and the fan mount, and the upstream end of the first air chamber communicates with the external environment via the filter, the fan mount including an air inlet for the fan mount, an inner cavity of the cylinder portion being the second air chamber, and a downstream end of the first air chamber and a lower upstream end of the second air chamber communicate with each other via the air inlet of the fan mount, the vacuum cleaner further including an upper cover, wherein the main air outlet is defined in the upper cover, the fan cover including a fan cover air outlet, a gap enclosed between the upper cover and the fan cover being separated to form a third air chamber and a fourth air chamber; a downstream end of the second air chamber being connected to an upstream end of the third air chamber via the fan cover air outlet, a downstream end of the third air chamber being connected to the external environment via the main air outlet, the second air chamber and the third air chamber being combined to form the air outlet chamber, when the vacuum cleaner is in the suction mode, the airflow sequentially passing through the first air chamber, the second air chamber, the third air chamber, and then is discharged to the external environment.

6. A vacuum cleaner in accordance with claim 5, wherein the fan cover includes a first baffle configured to separate a gap between the upper cover and the fan cover to form the third air chamber and the fourth air chamber, when the vacuum cleaner is in a self-cleaning mode, the airflow in the first air chamber sequentially enters the second air chamber, the third air chamber, and the sixth air chamber, and finally blows toward the clean side of the filter.

7. A vacuum cleaner in accordance with claim 5, wherein the first air inlet is defined in the upper cover, and a second air inlet is defined in the fan cover, the first air inlet and the second air inlet being located in an area where the fourth air chamber is located, an upstream end of the fourth air chamber being connected to the external environment via the first air inlet, a downstream end of the fourth air chamber being connected to an upstream end of the fifth air chamber via the second air inlet, and the fourth air chamber and the fifth air chamber being combined to form an air supply passage, the fan mount defining an air supply hole, a downstream end of the fifth air chamber communicating with the first air chamber via the air supply hole, when the vacuum cleaner is in the self-cleaning mode, the airflow from the external environment passing through the fourth air chamber, the fifth air chamber, and the first air chamber to enter the second air chamber, the air supply hole being adjacent to the air inlet of the fan mount.

8. A vacuum cleaner in accordance with claim 5, wherein when in self-cleaning mode, the main air outlet is closed, and the entire airflow between the fan and the main air outlet can flow to a partial clean side of the filter, and when in self-cleaning mode, the air inlet is at least partially closed.

* * * * *